(12) United States Patent
Sato

(10) Patent No.: US 7,218,841 B2
(45) Date of Patent: May 15, 2007

(54) METHOD AND APPARATUS FOR SYNCHRONOUSLY REPRODUCING AUDIO AND VIDEO DATA

(75) Inventor: Jun Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1421 days.

(21) Appl. No.: 10/022,252

(22) Filed: Dec. 20, 2001

(65) Prior Publication Data

US 2002/0082845 A1    Jun. 27, 2002

(30) Foreign Application Priority Data

Dec. 25, 2000   (JP)   ............... 2000-392287

(51) Int. Cl.
*H04N 5/91*     (2006.01)
(52) U.S. Cl. .................. 386/96; 386/104; 386/112
(58) Field of Classification Search .................. 386/46, 386/95, 96, 98, 104, 112, 125, 68
See application file for complete search history.

(56) References Cited

U.S. PATENT DOCUMENTS 6,393,574 B1 *   5/2002   Kashiwagi et al. ......... 713/400
6,801,707 B1 *  10/2004   Harumoto et al. ............ 386/46

FOREIGN PATENT DOCUMENTS

| JP | 10-262208 | 9/1998 |
|---|---|---|
| JP | 3100308 | 8/2000 |

* cited by examiner

*Primary Examiner*—Huy Nguyen
(74) *Attorney, Agent, or Firm*—Finnegan, Henderson, Farabow, Garrett & Dunner, L.L.P.

(57) ABSTRACT

Disclosed herein is an audio and video data synchronous reproduction method, wherein an audio decoder decodes audio data separated by a demultiplexer from the multiplexed stream in which audio data, video data and a time stamp are multiplexed. A video decoder decodes video data separated by the demultiplexer from the multiplexed stream. Reproduction processing on audio and video data is paused in response to the request to pause the reproduction of the audio and video data. The reproduction processing on the audio and video data a video decoder is resumed in response to the request to release the pause in the reproduction of the audio and video data. The respective internal clocks included in the demultiplexer, the audio decoder and the video decoder is, before the resuming, set to indicate a single time.

10 Claims, 3 Drawing Sheets

METHOD AND APPARATUS FOR SYNCHRONOUSLY REPRODUCING AUDIO AND VIDEO DATA

CROSS-REFERENCE TO RELATED APPLICATIONS

This application is based upon and claims the benefit of priority from the prior Japanese Patent Application No. 2000-392287, filed Dec. 25, 2000, the entire contents of which are incorporated herein by reference.

BACKGROUND OF THE INVENTION

1. Field of the Invention

The present invention relates to an audio and video data synchronous reproduction apparatus and method for reproducing the multiplexed stream in which audio and video data are multiplexed together with time stamps.

2. Description of the Related Art

A method for reproducing the multiplexed stream (e.g. MP4 file) in which coded audio and video data is multiplexed together with time information is proposed.

The multiplexed stream contains presentation time stamps each of which indicates, for example, the output timing of information for each audio and video frame. The time stamp is compared with the time indicated by an internal clock in a decoder, thereby determining the output timing of the decoder.

A description will be given about, for example, a voice signal. An audio decoder decodes audio data separated from the multiplexed stream. The audio decoder compares a presentation time stamp attached to each decoded audio frame with the time (generally, a counter value, which is periodically incremented) indicated by the internal clock included therein. As a result of the comparison, if the presentation time stamp is identical to or exceeds the internal time, a signal is output to an output device such as a loudspeaker.

Similarly, a video decoder decodes video data. Also in this case, the video decoder compares the presentation time stamp attached to each decoded video frame with the time indicated by the internal clock included therein. As a result of the comparison, if the presentation time stamp is identical to or exceeds the indicated time of the internal clock, a signal is output to an output device such as an LCD (Liquid Crystal Display).

If there is a pause request during reproduction, current processing on a frame is continued until the processing is finished, and the apparatus is set to a standby state. The internal clock of each decoder stops incrementing the counter value when the current processing on the frame has finished. Accordingly, the internal clock holds the internal time at which the process has finished.

In general, the time period required for decoding differs between the audio decoder and the video decoder. Accordingly, after a pause process finishes, the internal clocks of the audio and video decoders indicate different times (i.e. different counter values).

Therefore, when the pause has been released, the audio and video data may be reproduced at different points in time, since the audio and video decoders hold different internal times.

If audio and video data are reproduced at different times every time a pause is executed and released, this may annoy the user. At worst, it is possible that an initial frame immediately after the release of a pause will not be reproduced. If one or more frames are not reproduced, resultant reproduced data is incomplete. Specifically, the display may be lacking in the contents, or voice may be disjointed, which must be avoided.

BRIEF SUMMARY OF THE INVENTION

The present invention has been developed in light of the above. There is a need to provide an audio and video data synchronous reproduction method and apparatus capable of executing appropriate reproduction, even after the release of a pause, without any problems resulting from different timings of audio and video data reproduction.

According to an aspect of the invention, there is provided an audio and video data synchronous reproduction method for decoding, using an audio decoder, audio data separated by a demultiplexer from the multiplexed stream in which audio data, video data and a time stamp are multiplexed, and decoding, using a video decoder, video data separated by the demultiplexer from the multiplexed stream, the method comprising:

pausing reproduction processing on audio and video data in response to a request to pause the reproduction of the audio and video data;

resuming the reproduction processing on the audio and video data in response to a request to release the pause in the reproduction of the audio and video data; and setting, before the resuming, internal clocks to indicate a single time, the clocks which are respectively included in the demultiplexer, the audio decoder and the video decoder.

According to another aspect of the invention, there is provided an audio and video data synchronous reproduction apparatus for decoding, using an audio decoder, audio data separated by a demultiplexer from the multiplexed stream in which audio data, video data and a time stamp are multiplexed, and decoding, using a video decoder, video data separated by the demultiplexer from the multiplexed stream, the apparatus comprising:

a pause section configured to pause reproduction processing on audio and video data in response to a request to pause the reproduction of the audio and video data;

a resuming section configured to resume the reproduction processing on the audio and video data in response to a request to release the pause in the reproduction of the audio and video data; and a setting section configured to set, before resumption of the reproduction processing, internal clocks to indicate a single time, the clocks which are respectively included in the demultiplexer, the audio decoder and the video decoder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
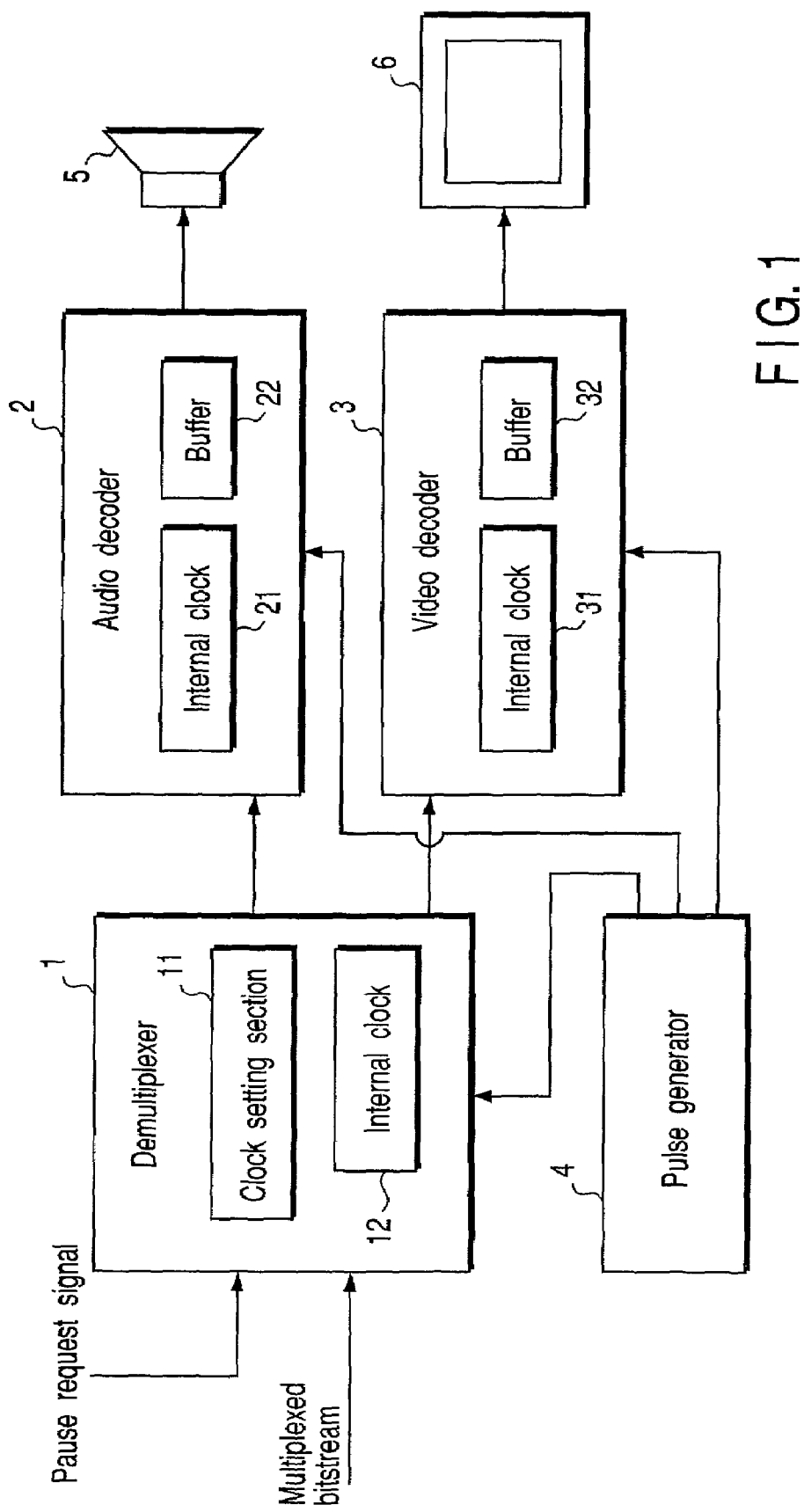
FIG. 1 is a schematic block diagram illustrating an apparatus for synchronously reproducing audio and video data according to an embodiment of the present invention.

An embodiment of the present invention will be described with reference to the accompanying drawings. FIG. 1 is a schematic block illustrating an apparatus for synchronously reproducing audio and video data according to the embodiment.

This apparatus comprises a demultiplexer 1 for receiving a multiplexed bitstream as an input signal, and separating the multiplexed bitstream into video data and audio data; an audio decoder 2 for receiving and decoding audio data separated by the demultiplexer 1; and a video decoder 3 for receiving and decoding video data separated by the demultiplexer 1.

The demultiplexer 1, audio decoder 2 and video decoder 3 are provided with internal clocks 12, 21 and 32, respectively. Each internal clock increments its counter value every time each clock receives a clock signal pulse output from a pulse generator 4. Further, the output of the audio decoder 2 is temporarily stored in a buffer 22 and then input to a voice output device 5 such as a loudspeaker. The output of the video decoder 3 is temporarily stored in a buffer 32 and then input to a video output device 6 such as an LCD.

The demultiplexer 1 includes a clock setting section 11. The clock setting section 11 is configured to receive a pause request signal generated from, for example, a CPU, and to set the time indicated by each internal clock (12, 21 and 31).

Figure 2:
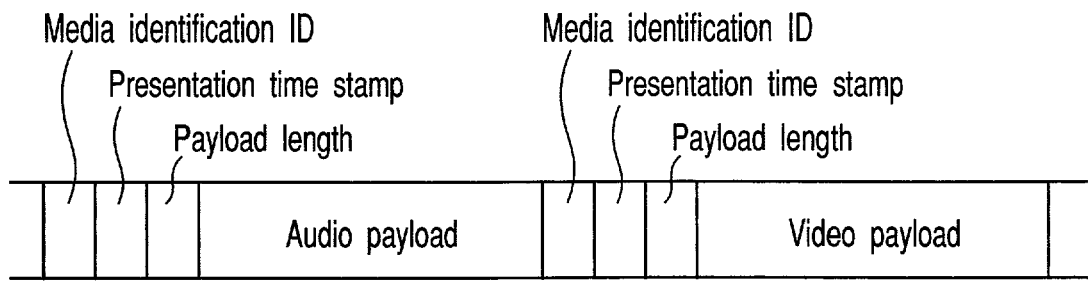
FIG. 2 is a view illustrating the configuration of a multiplexed bitstream input to a demultiplexer appearing in FIG. 1.

FIG. 2 shows an example of a multiplexed bitstream. The multiplexed bitstream comprises a media identification ID, a presentation time stamp, a payload length and a payload. In the bitstream example of FIG. 2, a video payload follows an audio payload.

The media identification ID is used to identify whether the successive payload is an audio payload or a video payload. For example, the identification ID of 1 indicates an "audio" payload, and the identification ID of 2 indicates a "video" payload. The presentation time stamp indicates the presentation timing of each payload, using a numerical value in the unit of, for example, "ms". The payload length indicates the length of a payload arranged next to the payload length field, in the unit of "bytes". However, this embodiment is not limited to this format.

On the basis of such field information, the demultiplexer 1 subjects a multiplexed bitstream to separation processing. The demultiplexer 1 imparts respective time stamps and payloads to the audio decoder 2 and the video decoder 3.

Upon receiving an external reproduction start command, the internal clocks 12, 21 and 31 are reset to an initial value, whereby they are synchronized with each other. While the demultiplexer 1, audio decoder 2 and video decoder 3 are operating, the internal clocks 12, 21 and 31 have their respective counter values incremented by "1" every time the pulse generator 4 for controlling operation timings generates a clock pulse (the device 4 generates a clock pulse per unit time (e.g. 1 ms)).

The audio decoder 2 decodes audio data coded by a coding method such as AAC, G.729, AMR or MPEG2, etc., thereby comparing a presentation time stamp (PTS) attached to the audio data with an internal time (TA) indicated by the internal clock 21. If PTS≧TA, the audio decoder 2 outputs a audio signal to the voice output device 5 via the buffer 22.

Similarly, the video decoder 3 decodes video data coded by a coding method such as MPEG1, MPEG2, MPEG4, H.261 or H.263, etc., thereby comparing a presentation time stamp (PTS) attached to the video data with an internal time (TV) indicated by the internal clock 32. If PTS≧TV, the video decoder 3 outputs a video signal to the video output device 6 via the buffer 32.

Suppose, here, a case where a pause process is executed while the demultiplexer 1, audio decoder 2 and video decoder 3 are operating. Upon receiving an external pause request, the demultiplexer 1, audio decoder 2 and video decoder 3 continue current processing on a data frame until they finish the processing. When they stop processing, they stop the operation of their internal clocks.

Specifically, when the demultiplexer 1 has stopped its separation processing, the demultiplexer 1 finishes separation of a payload. Further, when the decoders 2 and 3 have stopped their decoding processing, the decoders 2 and 3 finish the processing on an audio frame and a video frame, respectively.

In general, unit-processing time differs between devices. For example, the unit-processing time of the demultiplexer 1 is 10 ms, the unit-processing time of the audio decoder 2 is 20 ms, and the unit-processing time of the video decoder 3 is 33 ms.

Since the internal clocks start their counting after they are reset, the counter values of the internal clocks are identical before the internal clocks receive a pause request. However, when the devices have finished their processing after receipt of a pause request, their internal clocks indicate different internal times.

Suppose a case where a pause process is executed when the devices have started their unit processing. In this case, the internal time (TD) of the demultiplexer 1 is the sum of the processing time (10 ms) required for the unit processing and the time point (TP) at which the pause request has been issued. Similarly, the internal time (TA) of the audio decoder 2 is the sum of 20 ms and TP, and the internal time (TV) of the video decoder 3 is the sum of 33 ms and TP.

If the devices having their respective internal times resume reproduction in response to a request to release the pause, voice output and video output are executed at different timings since the internal clocks of the devices indicate different times.

Furthermore, if there is a device having its internal time advanced from the pause request time (TP), and the initial frame after the resumption of reproduction has a time stamp earlier than the internal time, the initial frame will not be reproduced.

To avoid the above problems, in the embodiment, the internal times indicated by the internal clocks are set to the same value before the resumption of reproduction. The initial value setting executed when resuming reproduction prevents voice and video signals from being output at different timings after the resumption of reproduction.

Figure 3:
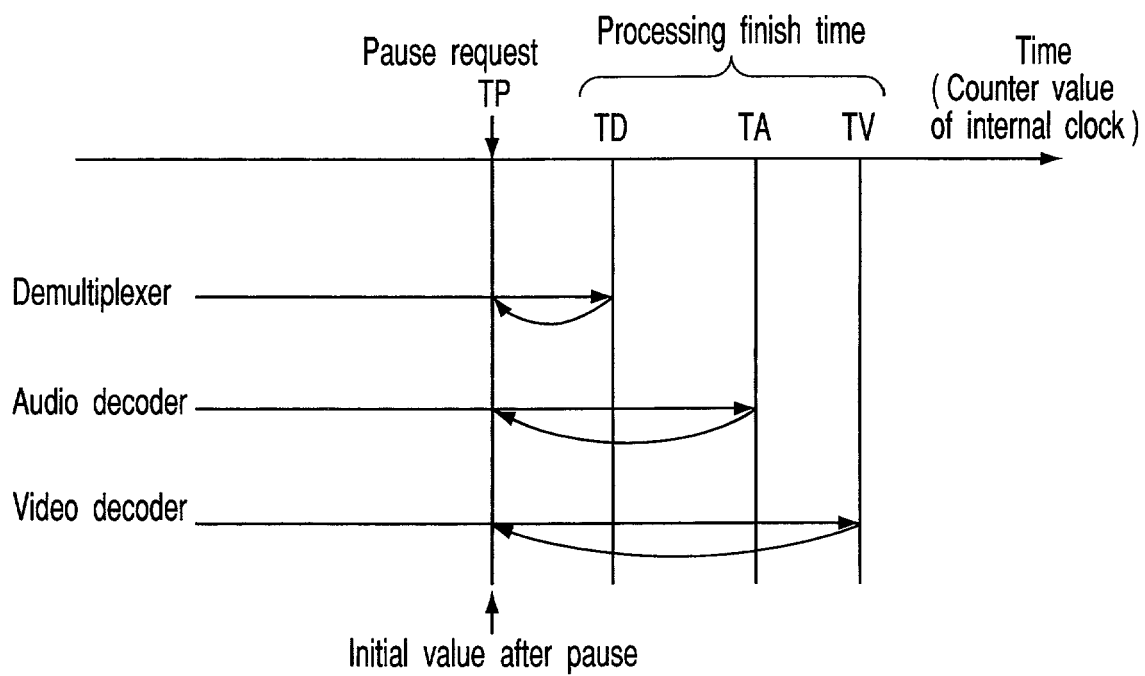
FIG. 3 is a view illustrating time points indicated by (the counter values of) three internal clocks appearing in FIG. 1, and useful in explaining the process of returning each time point to a time point at which a pause request is executed.
Figure 4:
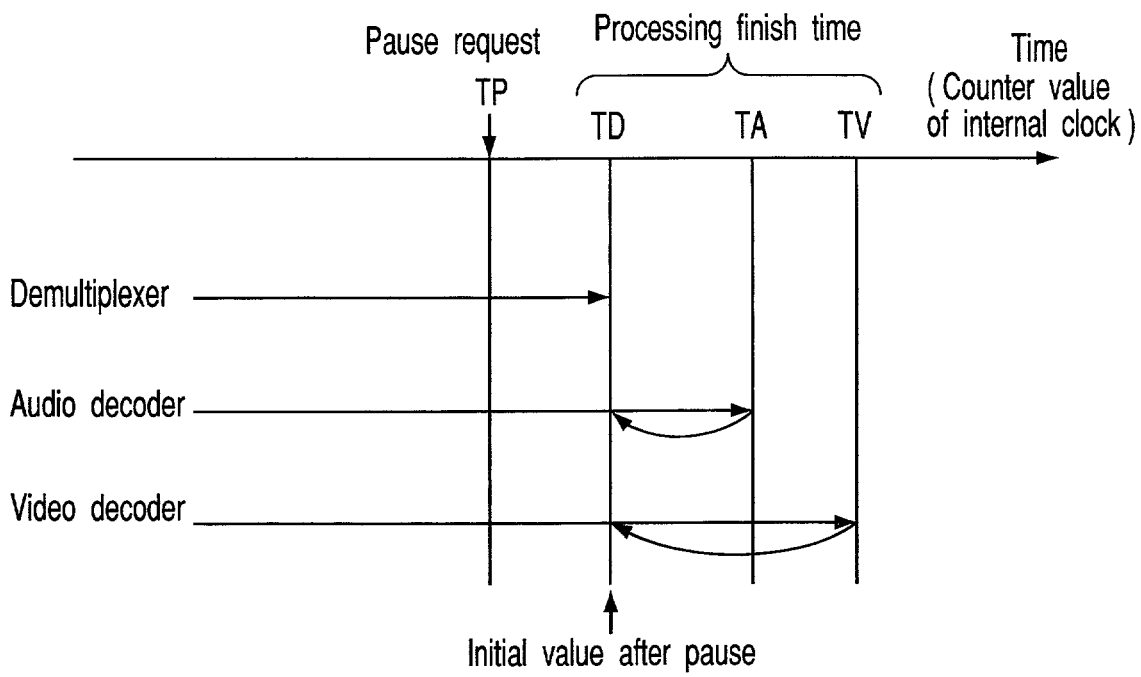
FIG. 4 is a view illustrating time points indicated by (the counter values of) the three internal clocks appearing in FIG. 1, and useful in explaining the process of returning the time points indicated by the internal clocks of an audio decoder and a video decoder to a time point indicated by the internal clock of the demultiplexer.
Figure 5:
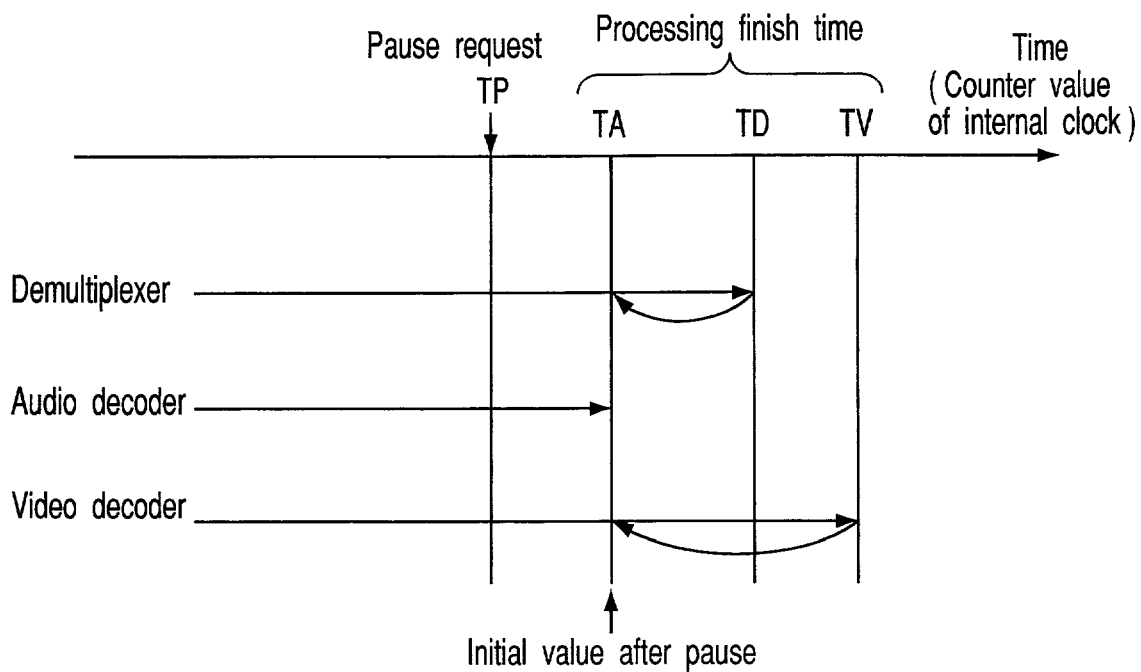
FIG. 5 is a view illustrating time points indicated by (the counter values of) the three internal clocks appearing in FIG. 1, and useful in explaining the process of returning the other two time points to the earliest time point.

FIGS. 3–5 show examples, in which the internal times are set to an initial value in different manners.

In the case of FIG. 3, the internal times (TD, TA and TV) are adjusted to the pause request time (TP). In the case of FIG. 4, the internal times (TA and TV) are adjusted to the internal time (TD) of the demultiplexer 1 after the pause.

Further, it is not always necessary to set the internal times to a fixed time such as TD or TP. The internal times may be adjusted to the earliest time after the pause (i.e. to the internal time of a device that stops earliest). FIG. 5 shows an example of this case. In the case of FIG. 5, since the audio decoder 2 has finished the processing earliest, the internal times of the other devices are adjusted to the internal time (TA) indicated by the internal clock of the audio decoder 2.

The output of the demultiplexer 1 is supplied to each decoder via a buffer (not shown). Accordingly, if the internal time (TD) of the demultiplexer 1 is used as the initial value for the internal clocks after the resumption of reproduction, the frames before the time TD have been already sent to the buffer.

Moreover, the buffers 22 and 32 included in the audio decoder 2 and video decoder 3, respectively, temporarily store decoded data. Accordingly, even if there is a pause request during a decoding process in each decoder 2 or 3, data ranging from the pause request time (TP in FIG. 3) to the decode finish time (TA and TV in FIG. 3) is temporarily stored in the buffers 22 and 32.

Consequently, data output from the audio and video decoder 2 and 3 at and after the pause request time (TP) is always complete, which means that no data loss occurs at the resumption of reproduction.

The apparatus and method for synchronously reproducing audio and video data, according to the embodiment of the present invention, can be used when there is reproduction data which is reproduced. For example, the apparatus and method can be used in a video viewer in a mobile phone, a PDA (Personal Digital Assistant), an HDD (Hard Disk Drive) decoder and a DVD (Digital Video Disk). In addition, they can be also used in a digital camera for reproducing recorded data.

The setting of the counter value of the internal clock (21 or 32) of each decoder (2 or 3) to a single value before a pause in reproduction enables the output time point of audio and video data to be adjusted to a reference time point when reproduction of data is resumed after the pause is released. Further, the adjustment of the internal time of each decoder (2 or 3) as above can prevent a defect from resulting from different data-output timings during data reproduction.

The internal clocks (12, 21 and 32) can be adjusted to indicate any appropriate time. Since the demultiplexer 1, the audio decoder 2 and the video decoder 3 have their respective internal clocks, it is preferable to set a reference time to the counter value of the internal clock of one of the devices.

For example, the internal clock (21 or 32) of each decoder (2 or 3) may be set to indicate a time identical to the stop time of the internal clock 12 of the demultiplexer 1. The stop time is assumed as the time when the demultiplexer 1 has finished its separation processing. Furthermore, the internal clock (21 or 32) of each decoder (2 or 3) may be set to indicate the time identical to the stop time of one of the internal clocks (12, 21 and 32) which has stopped earliest when the devices have finished their respective processes.

The counter values of the internal clocks (12, 21 and 32) may be adjusted at any desired time point. For example, the time when a pause request has been issued may be used as the initial value for the internal clocks (12, 21 and 32). Alternatively, the time indicated by the internal clock (21 or 32) of one of the audio decoder 2 and the video decoder 3 which has finished its processing latest may be used as the internal time of the internal clock 12 of the demultiplexer 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An audio and video data synchronous reproduction method for decoding, using an audio decoder, audio data separated by a demultiplexer from the multiplexed stream in which audio data, video data and a time stamp are multiplexed, and decoding, using a video decoder, video data separated by the demultiplexer from the multiplexed stream, the method comprising:
    pausing reproduction processing on audio and video data in response to a request to pause the reproduction of the audio and video data;
    resuming the reproduction processing on the audio and video data in response to a request to release the pause in the reproduction of the audio and video data; and
    setting, before the resuming, internal clocks to indicate a single time, the clocks which are respectively included in the demultiplexer, the audio decoder and the video decoder.

2. The method according to claim 1, further comprising determining the timing of the reproduction processing by comparing the times indicated by the internal clocks with the time stamp.

3. The method according to claim 1, wherein the setting comprises setting, before the resuming, the times indicated by the internal clocks of the audio decoder and the video decoder to the time indicated by the internal clock of the demultiplexer.

4. The method according to claim 1, wherein the setting comprises setting, before the resuming, the times indicated by the respective internal clocks of the demultiplexer, the audio decoder and the video decoder to the smallest value in the times indicated by the internal clocks.

5. The method according to claim 1, wherein the setting comprises setting, before the resuming, the times indicated by the respective internal clocks of the demultiplexer, the audio decoder and the video decoder to the time when the request to release the pause has been issued.

6. An audio and video data synchronous reproduction apparatus for decoding, using an audio decoder, audio data separated by a demultiplexer from the multiplexed stream in which audio data, video data and a time stamp are multiplexed, and decoding, using a video decoder, video data separated by the demultiplexer from the multiplexed stream, the apparatus comprising:
    a pause section configured to pause reproduction processing on audio and video data in response to a request to pause the reproduction of the audio and video data;

a resuming section configured to resume the reproduction processing on the audio and video data in response to a request to release the pause in the reproduction of the audio and video data; and a setting section configured to set, before resumption of the reproduction processing, internal clocks to indicate a single time, the clocks which are respectively included in the demultiplexer, the audio decoder and the video decoder.

7. The apparatus according to claim 6, further comprising a determination section configured to determine the timing of the reproduction processing by comparing the times indicated by the internal clocks with the time stamp.

8. The apparatus according to claim 6, wherein the setting section sets, before the resumption of the reproduction processing, the times indicated by the internal clocks of the audio decoder and the video decoder to the time indicated by the internal clock of the demultiplexer.

9. The apparatus according to claim 6, wherein the setting section sets, before the resumption of the reproduction processing, the times indicated by the respective internal clocks of the demultiplexer, the audio decoder and the video decoder to the smallest value in the times indicated by the internal clocks.

10. The apparatus according to claim 6, wherein the setting section sets, before the resumption of the reproduction processing, the times indicated by the respective internal clocks of the demultiplexer, the audio decoder and the video decoder to the time when the request to release the pause has been issued.

* * * * *